(12) United States Patent
Shimizu et al.

(10) Patent No.: US 6,457,314 B1
(45) Date of Patent: Oct. 1, 2002

(54) POWER TRANSMISSION STRUCTURE OF A MOTOR ASSIST APPARATUS FOR A VEHICLE

(75) Inventors: Michinori Shimizu; Daisaku Takahashi, both of Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/949,537

(22) Filed: Sep. 7, 2001

(30) Foreign Application Priority Data

Sep. 18, 2000 (JP) ........................................ 2000-281268

(51) Int. Cl.$^7$ .............................................. F01B 21/04
(52) U.S. Cl. .......................................... 60/718; 60/716
(58) Field of Search ...................... 60/698, 716, 718; 180/69.6

(56) References Cited

U.S. PATENT DOCUMENTS 4,958,095 A * 9/1990 Uchida et al. ................ 310/59
5,258,651 A * 11/1993 Sherman ...................... 290/23
6,116,364 A * 9/2000 Taguchi et al. ............. 180/65.2
6,311,495 B1 * 11/2001 Shimizu et al. ............... 60/718

FOREIGN PATENT DOCUMENTS

JP          11-078555          3/1999

* cited by examiner

*Primary Examiner*—Hoang Nguyen
(74) *Attorney, Agent, or Firm*—Flynn, Thiel, Boutell & Tanis, P.C.

(57) ABSTRACT

A power transmission structure of a motor assist apparatus for a vehicle, wherein a ring gear need not have a flywheel function, such that a width of a flywheel can be reduced and a length of a motor housing can be shortened. In a vehicle with front wheel drive, because the starter motor does not interfere with a drive shaft, the degree of freedom in layout of the drive shaft, starter motor and the like increases. A ring gear installation member mounting a ring gear on an outer circumferential location thereof is provided between a rotor installation member (which mounts thereon a motor rotor of the engine) and a crank shaft of the engine.

12 Claims, 3 Drawing Sheets

POWER TRANSMISSION STRUCTURE OF A MOTOR ASSIST APPARATUS FOR A VEHICLE

FIELD OF THE INVENTION

This invention relates to a power transmission structure of a motor assist apparatus for a vehicle, and particularly to a power transmission structure of a motor assist apparatus for a vehicle including a motor (electric motor) which is driven by electrical energy and has an electric power generating function, which motor assists the driving force of an engine driven by the combustion of fuel.

BACKGROUND OF THE INVENTION

Some motor vehicles are of a type commonly called a hybrid vehicle which include an engine driven by the combustion of fuel and a motor (electric motor) which is driven by electrical energy and which has a power generating function, wherein the engine is directly connected with the motor.

This motor of the hybrid vehicle is built in a motor housing arranged between a cylinder block of an engine mounted on the vehicle and case of a transmission, and consists of a motor rotor which is fixed to a rotor installation member so as to rotate with a crank shaft of the engine and a motor stator (coil) fixed in the motor housing and corresponding to this motor rotor. Such a motor assists driving force of the engine. The motor rotor possesses the flywheel, which lets inertia force occur.

One such example of a motor assist apparatus for a vehicle is disclosed in published Japanese Application Laid-Open No. 11-78555. The motor assist apparatus for a vehicle disclosed in this application includes a motor arranged between an engine and a flywheel, a ring gear arranged in an outer circumferential section of the flywheel, and a starter motor engaged with this ring gear.

However, in this motor assist apparatus, traditionally, because a ring gear is arranged in an outer circumferential section of the flywheel, the thickness (width) of the flywheel needs to be made larger in order to allow installation of the ring gear. In other words, the flywheel must be formed with a thickness sufficient to fulfill the flywheel function and to allow installation of the ring gear. Thus, the thickness of the flywheel must be increased and accordingly, the width of the whole motor must be increased, resulting in an inconvenient increase in weight.

In addition, a ring gear located in an outer circumferential section of a flywheel restricts a layout of a starter motor. Specifically, in order for the flywheel to produce the necessary inertial force so that the rotational speed of the engine is stable during low rotational speeds, the flywheel needs the extra capacity (thickness or width) at a position that is near to the crank rotation center. Accordingly, because a radius of gyration that is easy to adjust in order to get necessary inertial force cannot be taken greatly, there is the inconvenience that the weight must be increased.

Furthermore, because a motor is arranged between an engine and a flywheel, a starter motor needs to be arranged on the transmission side. In a vehicle having front wheel drive (FF), the degree of freedom of layout increases when a starter motor is arranged on an engine side due to the arrangement of the drive shaft.

However, a starter motor interferes with a drive shaft when the starter motor is arranged on the transmission side, and then there is an inconvenience due to restrictions on layout.

In order to obviate or minimize the above inconveniences, the present invention provides a power transmission structure of a motor assist apparatus for a vehicle, including a motor housing in which a motor is disposed between a cylinder block of an engine mounted on a vehicle and a case of a transmission. The motor includes a motor rotor which mounts to a rotor installation member having a flywheel, and a motor stator disposed within the motor housing so as to correspond to this motor rotor, wherein between the rotor installation member and a crank shaft of the engine, a ring gear installation member is arranged which possesses a ring gear in an outer circumferential location thereof.

In this invention, because the ring gear installation member which possesses a ring gear in an outer circumferential location is arranged between a rotor installation member and a crank shaft of the engine, the ring gear need not have a flywheel function, and the only function is to engage with a starter motor. Accordingly, the thickness of a flywheel can be reduced, and the width of a motor housing can be shortened. In addition, because the ring gear is arranged between a crank shaft and the motor housing, a starter motor can be installed from the engine side, and in a vehicle with front wheel drive (FF), the starter motor does not completely interfere with a drive shaft. Accordingly, the degree of freedom of layout of the drive shaft, starter motor and the like increases.

DETAILED DESCRIPTION

Figure 1:
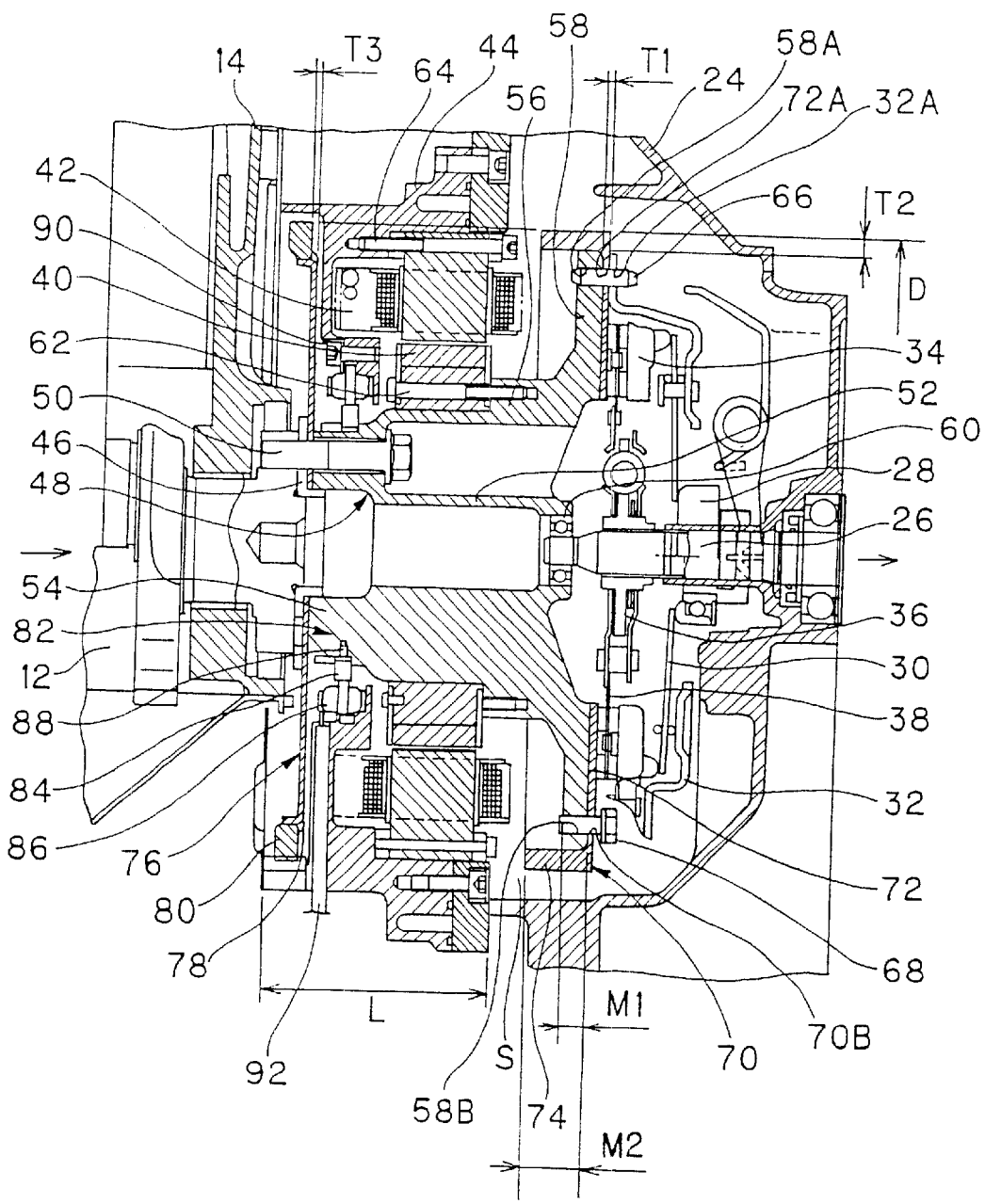
FIG. 1 is a sectional view of a motor section.
Figure 2:
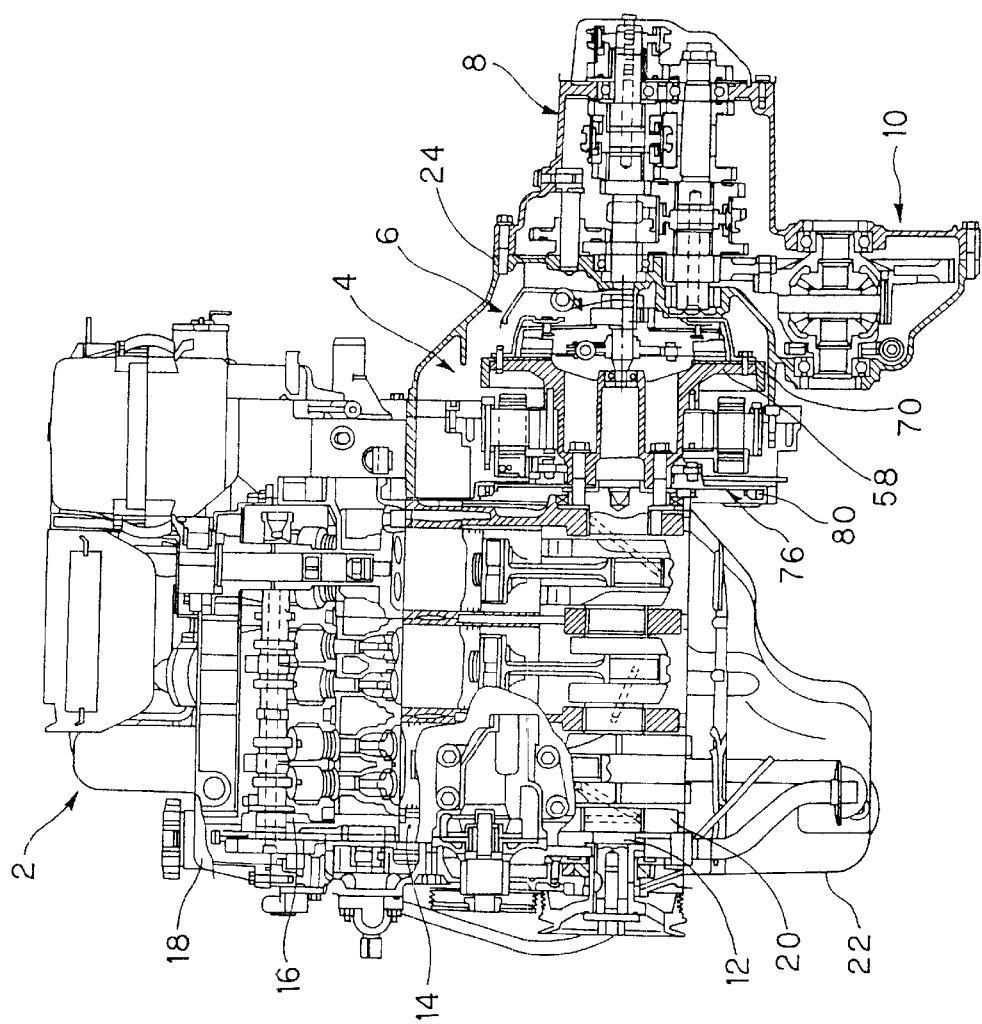
FIG. 2 is a sectional view of an engine, motor, clutch, transmission and a differential.

A detailed and concrete explanation will be given of embodiments according to the invention with reference to the drawings as follows. FIGS. 1 and 2 show a first embodiment according to the invention. In FIG. 2, reference numeral 2 denotes an engine mounted on a hybrid vehicle (not shown); 4 a motor (electric motor) for a motor assist apparatus; 6 a clutch; 8 a transmission; and 10 a differential.

Engine 2 is driven by the combustion of fuel, possesses a crank shaft 12, and includes a cylinder block 14, a cylinder head 16, a cylinder head cover 18 and crank lower case 20, and an oil pan 22.

Clutch 6 is surrounded by transmission case 24, and consists of an input shaft 26 that is concentric to crank shaft 12, a release bearing 28 which moves axially on this input shaft 26, a diaphragm 30 which at an inner edge is connected to or engages this release bearing 28, a clutch cover 32 to maintain the circumferential location of this diaphragm 30, a pressure plate 34 that is connected to or engages with the outer circumference of diaphragm 30, and a clutch plate 38 arranged in a hub 36 which moves axially on input shaft 26.

Motor 4 is directly connected to an end section of crank shaft 12 of engine 2. This motor 4 is arranged between crank shaft 12 and clutch 6, and includes a motor rotor 40 driven by electrical energy and having power generating functions, and a motor stator (coil) 42 disposed for correspondence to this motor rotor 40 built in motor housing 44. This motor housing 44 is arranged between the side of cylinder block 14 and transmission case 24.

A rotor installation member 48 is fixed to an end section of crank shaft 12 with a fixing bolt 50 which extends through crank shaft side support flange 46. This rotor installation member 48 is made of lightweight materials, for example, aluminum alloy, and is integral with a center shaft part 52 oriented axially along a central axis of crank shaft 12. A flange part 54 is oriented radially at one end of crank shaft 12 from the side of this center shaft part 52, and a maintenance part 56 is attached to an outer circumferential area of this flange part 54 and is parallel with a circumference of center shaft part 52. A flywheel 58 extends radially adjacent an end of this maintenance part 56 and has a predetermined size. In this rotor installation member 48, flange part 54 is installed on crank shaft 12 by fixing bolt 50, and another end side of center shaft part 52 supports input shaft 26 of clutch 6 by means of a ball bearing 60.

Motor rotor 40 is installed on maintenance part 56 with an axially oriented rotor installation bolt 62, and motor stator 42 is installed to motor housing 44 with an axially oriented stator installation bolt 64.

Clutch cover 32 of clutch 6 is positioned relative to flywheel 58 by a knock pin 66, and is connected to flywheel 58 by a connecting bolt 68.

This flywheel 58 is formed so as to have the necessary thickness (width) to allow installation of motor stator 42 and is of a size necessary for engagement with clutch plate 38. In addition, from a standpoint of light weight and strength, the flywheel 58 is integral with rotor installation member 48 and is formed from aluminum alloy material. Thus, the flywheel is light weight and is arranged on the transmission side relative to motor rotor 40.

On an end face of the flywheel 58 on the transmission side, a strengthening member 70 is arranged by the knock pin 66 and connecting bolt 68 between clutch cover 32 and clutch plate 38 and the flywheel 58. This strengthening member 70 is formed from iron material in order to raise the inertial force and to improve wear resistance, since flywheel 58 which is made light weight cannot attain the inertial force which is required in order to stabilize engine rotational speed during low rotation of engine 2. Further, flywheel 58 must have the necessary strength to allow for frictional engagement with clutch plate 38. The strengthening member 70 consists of a plate part 72 formed with a predetermined thickness "T1" and oriented in parallel with clutch plate 38 of clutch 6 arranged between motor 4 and transmission 8, and an outer circumferential section 74 that is axially bent towards the engine side to cover flywheel 58 along with plate part 72 and is formed with a thickness "T2" that is larger than thickness "T1" of plate part 72. Plate part 72 is formed with the smallest thickness "T1" which is necessary for wear resistance due to engagement with clutch plate 38. Knock pin 66 is inserted in cover side pin hole 32A of clutch cover 32, plate side pin hole 72A of plate part 72, and flywheel side pin hole 58A of flywheel 58, respectively. Connection bolt 68 is inserted in cover side bolt hole (not shown) of clutch cover 32 and plate side bolt hole 72B of plate part 72, and threadingly engaged in flywheel side bolt screw hole 58B of flywheel 58.

In plate part 72, the outer circumferential section 74 that has width "M2" larger than thickness "M1" of flywheel 58 turns down and is formed so as to let inertial force increase.

In other words, this outer circumferential section 74 is arranged in parallel to the axial direction of rotor installation member 48 in existing space "S", and is formed to bend towards the engine side. In addition, this outer circumferential section 74 is formed with thickness "T2" which is larger than thickness "T1" of plate part 72 in order to improve the inertial force. In this outer circumferential section 74, the weight increases (in comparison with a flywheel having a ring gear, since the ring gear is gear shaped and its weight is light) because the thickness is not decreased to outer diameter "D". Further, because section 74 is arranged at a far-off position serving as a weight body from the crank rotation center, the necessary inertial force is satisfied even if flywheel 58 is light in weight.

Between crank shaft side support flange 46 and one end side of center shaft part 52, a ring gear installation member (drive plate) 76, which is platelike or formed so as to have a plate shape with a small thickness "T3", is fixed to crankshaft 12 by bolt 50. This ring gear installation member 76 is formed with a predetermined thickness "T3" equivalent to a necessary gap with engine 2 and motor 4, and a ring gear 80 is installed to an outer circumferential area of member 76 through a weld or weld part 78. Because ring gear installation member (drive plate) 76 is relatively thin, the ring gear 80 gets the necessary strength in order to drive engine 2 from a starter, by adopting structure to turn down a plate. Starter motor (not shown) installed on the engine side is engaged with this ring gear 80.

In motor housing 44, a rotational position detection mechanism (sensor) 82 is arranged. This rotational position detection mechanism 82 consists of sensor rotor 84 and sensor stator (coil) 86 arranged for correspondence to this sensor rotor 84 in order to detect the rotational position of the motor rotor 40 relative to the motor stator 42.

In this rotational position detection mechanism 82, sensor rotor 84 is installed with an installation knock pin 88 to a location along the circumference of flange part 54, and sensor stator 86 is installed with sensor installation bolt 90 to motor housing 44. Signal line 92 is connected with this sensor stator 86.

Next, an explanation will be given of the operation of first embodiment.

When rotor installation member 48 rotates with crank shaft 12, then flywheel 58 rotates and the required inertial force occurs. In addition, by spinning ring gear 80 with a pinion gear of a starter motor, crank shaft 12 rotates and engine 2 can be started up.

Incidentally, in this embodiment, because ring gear installation member 76 that possesses ring gear 80 in its outer circumferential location is arranged between rotor installation member 48 and crank shaft 12 of engine 2, the ring gear 80 does not have a flywheel function and the only function is to engage with a starter motor. Therefore, the thickness of flywheel 58 is made small and width "L" of motor housing 44 is shorter than the conventional width. Accordingly, by this invention, the width of the whole motor 4 can be made small, and a lightweight flywheel 58 can be used. In addition, because ring gear 80 is arranged between crank shaft 12 and motor housing 44, a starter motor can be installed from the engine side, and in a vehicle having front wheel drive (FF), the starter motor does not interfere with a drive shaft. As a result, the degree of freedom of layout of the drive shaft, starter motor and the like increases.

Flywheel 58 is arranged on the transmission 8 side relative to motor rotor 40, and strengthening member 70 (which may be constructed of iron) is arranged on the end face of flywheel 58 on the at transmission side. Thus, because this strengthening member 70 has enough strength for frictionally engaging the clutch plate 38, the flywheel 58 itself does not need to have more strength than needed, and accordingly the flywheel can be constructed of materials of poor wear resistance. As a result, this invention can include a flywheel 58 light in weight and achieve a reduction of fuel consumption. In addition, by forming the flywheel 58 using material capable of good heat conduction, that is, aluminum alloy, the flywheel can diffuse frictional heat generated through engagement with clutch plate 38.

Further, strengthening member 70 consists of plate part 72 which is parallel to clutch plate 38 of clutch 6 arranged between motor 4 and transmission 8, and outer circumferential section 74 that is bent to cover flywheel 58 and formed at an outer circumferential location of this plate part 72 and has thickness "T2" which is greater than thickness "T1" of plate part 72. Thus, because the strengthening member 70 is divided into plate part 72 and outer circumferential section 74 in order to give priority to a necessary function, two functions that are contrary to each other (i.e. in situations where the thickness of plate part 72 of strengthening member 70 is reduced or thinned to allow shortening the width of the motor housing 44 and the thickness of outer circumferential section 74 of strengthening member 70 is increased or thickened in order to provide the required inertial force) can both be satisfied. Particularly, by forming the outer circumferential section 74 with a greater thickness "T2" in order to make a far-off position heavy from the crank rotation center, the inertial force can be improved, and driving the engine at a low rotational speed can be stabilized. Further, because thickness "T1" of plate part 72 is made thin, a light weight strengthening member 70 can be utilized.

Furthermore, because outer circumferential section 74 of strengthening member 70 is arranged in parallel to the axial direction of rotor installation member 48 and has a bent portion with an axial dimension "M2", the section 74 does not magnetically or electrically influence the motor stator 42. Accordingly, the space behind motor stator 42 of motor 4 (i.e. on the transmission side) "S" can be utilized effectively, and inertial force can be improved.

In addition, because the outer circumferential section 74 is installed along outer circumferential diameter "D", which is almost equal to an outer circumferential diameter of ring gear 80, the inertial force can be improved.

Furthermore, in the arrangement of a drive system of a vehicle having front wheel drive (FF), when a starter motor is arranged on the transmission side, the starter motor can interfere with a drive shaft. But, in this embodiment, a starter motor is integrated at the engine side. Therefore, in case that a common arrangement with a hybrid vehicle is considered, because the starter motor is arranged at the engine side and flywheel 58 and ring gear 80 are separate components, the commonness of layout with an existing vehicle can be planned, and the degree of freedom of layout of drive shaft, starter motor and the like can be improved.

Figure 3:
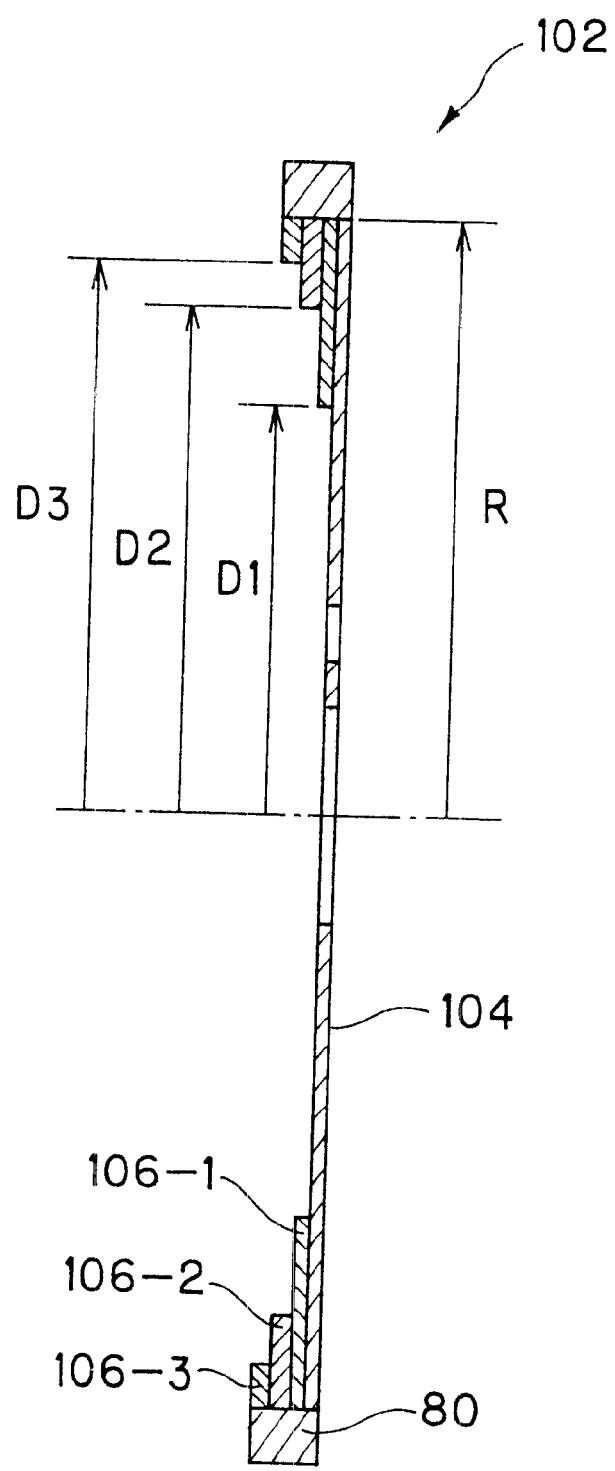
FIG. 3 is a sectional view of a ring gear formation body according to a second embodiment.

FIG. 3 is special formation of this invention, and shows a second embodiment.

In this second embodiment, when a part that functions the same as or similar to that of the first embodiment, the same reference numeral as that of the first embodiment is utilized.

A characteristic of this second embodiment is as follows. Ring gear formation body 102 consists of ring gear installation member 104 and a plurality of installation plates, for example three plates which are first, second and third installation plates 106-1, 106-2 and 106-3 that are joined in layers on this ring gear installation member 104. Ring gear 80 is installed on the outer circumferential surfaces of this ring gear installation member 104 and the first, second and third installation plates 106-1, 106-2 and 106-3. In ring gear installation member 104 and first, second and third installation plates 106-1, 106-2 and 106-3, the surfaces defining the outer diameters of these elements are formed with same radius "R", the thicknesses of the respective plates are almost the same, and the total thickness after being joined in layers is almost the same as the width of ring gear 80. The first installation plate 106-1 is joined to ring gear installation member 104 and is formed with an inside diameter "D1". The second installation plate 106-2 is joined to the first installation plate 106-1 and is formed with an inside diameter "D2" that is larger than inside diameter "D1" of first installation plate 106-1. The third installation plate 106-3 is joined to the second installation plate 106-2 and is formed with inside diameter "D3" that is larger than inside diameter "D2" of second installation plate 106-2.

According to this second embodiment, even if the thickness of ring gear installation member 104 is small, and first, second and third installation plates 106-1, 106-2 and 106-3 are joined to ring gear installation member 104 so as not to stick out from or project radially beyond ring gear 80, a narrow space can be utilized, the inertial force can be improved by the first, second and third installation plates 106-1, 106-2 and 106-3, and the production is simplified. In addition, the proper inertia can be easily achieved by changing the thickness and inside diameter of each installation plate 106-1, 106-2 and 106-3.

Incidentally, this invention is not limited to a hybrid vehicle having an engine and a motor, but each of the above embodiments can also be utilized in a vehicle having only an engine.

As been clear from above detailed description, according to this invention, because a power transmission structure of a motor assist apparatus for a vehicle arranges the ring gear installation member (which possesses a ring gear in an outer circumferential location) between a rotor installation member and a crank shaft of the engine, the ring gear need not have a flywheel function and the only function is to engage with a starter motor. Accordingly, width of a flywheel can be reduced, and the length of a motor housing can be shortened. In addition, because the ring gear is arranged between a crank shaft and the motor housing, a starter motor can be installed from the engine side, and in a vehicle having front wheel drive (FF), the starter motor does not interfere with a drive shaft completely. Accordingly, the degree of freedom of layout of drive shaft, starter motor and the like increases.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A power transmission structure of a motor assist apparatus for a vehicle comprising a motor housing between a cylinder block of an engine mounted on the vehicle and a transmission case of a transmission, a motor disposed in the motor housing and including a motor rotor mounted to a rotor installation member having a flywheel, and a motor stator mounted on said motor housing for correspondence to the motor rotor, wherein a ring gear installation member is provided between said rotor installation member and a crank shaft of said engine, the ring gear installation member including a ring gear in an outer circumferential location thereof.

2. A power transmission structure of a motor assist apparatus for a vehicle as defined in claim 1, wherein said flywheel is arranged on the transmission side relative to said motor rotor, and a strengthening member is arranged on the end face of said flywheel which faces said transmission side.

3. A power transmission structure of a motor assist apparatus for a vehicle as defined in claim 2, wherein said strengthening member comprises a plate part which is parallel to a clutch plate of a clutch arranged between said motor and said transmission, and an outer circumferential section disposed at an outer circumferential location of the plate part, the outer circumferential section being bent to cover said flywheel and being formed with a thickness which is greater than a thickness of said plate part.

4. A power transmission structure of a motor assist apparatus for a vehicle as defined in claim 3, wherein said outer circumferential section of said strengthening member is arranged in parallel to an axial direction of said rotor installation member and extends towards said engine side.

5. A power transmission structure of a motor assist apparatus for a vehicle as defined in claim 2, wherein said flywheel is integral with said rotor installation member and is formed of aluminum alloy material, and said strengthening member is formed of iron material.

6. A power unit for a vehicle, the power unit being drivingly connected to a transmission and comprising: an engine and an electric motor both provided as a source of drive for the vehicle and wherein the electric motor and a housing thereof are disposed between a cylinder block of the engine and a transmission case; a crankshaft supported on the cylinder block; a rotor mounting member fixed to the crankshaft for rotation therewith and including a flywheel; the electric motor including a rotor mounted on the rotor mounting member and a stator mounted in the housing adjacent the motor rotor; and a drive arrangement including a drive plate defining an outer circumference and a ring gear provided thereon, the ring gear being engageable with a starter motor to start the engine, the drive plate arrangement being interposed between the rotor mounting member and the crankshaft.

7. The power unit of claim 6 wherein the crankshaft defines a rotational axis and the drive plate arrangement and flywheel are axially spaced from one another on opposite sides of the electric motor such that the drive plate arrangement is disposed adjacent the engine and the flywheel is disposed adjacent the transmission.

8. The power unit of claim 6 wherein the flywheel defines a clutch-engaging side which faces towards the transmission, and a strengthening member is mounted to the clutch-engaging side of the flywheel so as to be interposed between the flywheel and a clutch.

9. The power unit of claim 8 wherein the strengthening member includes a generally radially oriented, plate-like and annular first part for engagement with a clutch plate, and a second part which projects generally axially from an outer circumferential area of the first part in a direction towards the cylinder block, the second part overlying an outer circumferential portion of the flywheel.

10. The power unit of claim 9 wherein the second part has a thickness as measured in a radial direction which is greater than a thickness of the first part as measured in an axial direction.

11. The power unit of claim 6 wherein the drive plate arrangement includes a plurality of said drive plates each having an annular shape, said drive plates being arranged in axially adjacent relationship with one another and having respective outer circumferences which are substantially equal in diameter with one another so as to define a mounting surface for the ring gear.

12. The power unit of claim 11 wherein the drive plates have respective inner circumferences which have varying diameters.

* * * * *